3,242,200
ESTERS OF HIGHER FATTY ACIDS HAVING HYDROXY AND ETHER SUBSTITUENTS ON ADJACENT CARBON ATOMS OF THE ACYL MOIETY

Keith Liddell Johnson, Park Forest, Ill., assignor to Swift & Company, Chicago, Ill., a corporation of Illinois
No Drawing. Filed Mar. 7, 1962, Ser. No. 177,968
7 Claims. (Cl. 260—398)

This invention relates to new compositions of matter and more specifically to the production of hydroxy ether derivatives of hydrophobic oxirane containing materials.

The compositions of the invention comprise derivatives of oxirane substituted aliphatic and alicyclic compounds with aliphatic mono or polyhydric, mono or polyethers by selection of the oxirane substituted reactant and the alcohol-ether reactant. It is possible to prepare emulsifiers and dispersing agents which are structurally similar to laboriously emulsifiable fats which are readily emulsified by the compositions of the invention.

It is an object of this invention to provide surface active agents from oxirane substituted organic compositions and polyhydric alcohols and derivatives thereof.

Another object of the invention is the provision of hydroxyl and ether substituted organic compositions wherein the hydroxyl substituent and the ether substituent are on adjacent carbons in a hydrocarbon chain.

Still another object of the invention is the provision of higher fatty acid derivatives having substituted on the aliphatic hydrocarbon chain of the fatty acid, hydroxyl groups and polyoxy-alkylene substituents on adjacent carbons in the chain.

Additional objects, if not specifically set forth herein, will be readily apparent to those skilled in the art from the detailed description of the invention which follows.

Generally, the compositions of the invention comprise derivatives of oxirane substituted aliphatic and alicyclic compositions wherein the oxirane group is broken and oxyalkylene containing compositions and radicals of lower polyhydric alcohol ethers are substituted on one carbon which before the reaction had formed the oxirane group and the adjacent carbon which had been the other carbon of the oxirane group is substituted with hydroxyl groups. The formation of the product can be represented as follows:

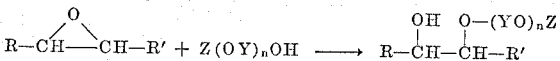

Where R is an alkyl or aryl group, R' is H or an aliphatic hydrocarbon radical, Y is an alkylene group of 2–4 carbons, $n$ is 1–100 and preferably 1–20 and Z is selected from the group consisting of acyl, phenyl, phenyl alkyl, lower alkyl and hydrogen.

More specifically the compositions of the invention include the products resulting from the catalyzed reaction between oxirane compositions of a hydrophobic character and having a molecular weight, preferably above about 200, with alcohols having at least one available hydroxyl group. Catalysts most useful in ensuring the desired reaction between the hydroxyl group of the alcohol and the oxirane group of the oxirane containing compositions are the strong Lewis acids and tertiary amines. At least one of the reactants must be bifunctional; that is, must possess two or more epoxy groups or two or more hydroxyl groups. Polyhydroxy compounds should not be reacted with polyepoxides since undesirable polymeric materials may result.

Highly effective surface-active materials are prepared by reacting monohydroxy substituted compositions with polyepoxides. Similarly, highly desirable surfactants result from the reaction between oxirane substituted compositions having an average of no more than about 1 epoxy group per molecule and polyols (di-, tri- and tetrahydric aliphatic alcohols). If monoepoxides are reacted with monohydroxy substituted ethers, the products are effective surface-active agents and also find application as intermediates in the production of surface-active agents.

Oxirane-substituted compounds which can be employed in producing the non-polymeric surface-active materials of the invention as has been noted previously, include hydrophobic higher molecular weight organic compositions having one or more oxirane groups. These compositions comprise aliphatic and alicyclic compounds such as epoxidized higher fatty acid derivatives and oxirane-substituted carbocyclic materials. Epoxidized triglycerides represent a very convenient source of oxirane-substituted higher fatty acids and derivatives thereof and nonfatty epoxy-containing materials are represented by the epoxy substituted vinyl benzenes such as ortho-, meta- and paradivinyl benzene dioxide. The epoxy-substituted vinyl cyclohexenes having the epoxy group on the vinyl chain such as vinyl cyclohexene oxide, epoxy-substituted cyclohexenes having the epoxy group on the cyclohexene ring as vinyl cyclohexene dioxide and 3,4-epoxy-1-methyl cyclohexyl methyl-3,4-epoxy-1-methyl cyclohexane carboxylate, 6-methyl-3,4-epoxy cyclohexyl methyl-6-methyl-3,4-epoxy cyclohexane carboxylate may also be used. Other oxirane-substituted materials include the oxirane-substituted cyclopentadienes such as dicyclopentadiene oxide and dicyclopentadiene dioxide as well as the diepoxides from condensation products such as the diglycidyl ether of bisphenol A.

The oxirane-containing higher fatty acids (10–22 carbons) and derivatives thereof represent a very convenient source of the oxirane reactant. Epoxidized animal, vegetable and marine triglycerides are well known in the art, and examples of these materials include epoxidized soybean oil, epoxidized linseed oil, epoxidized safflower oil, epoxidized perilla oil, epoxidized lard oil, epoxidized tallow, epoxidized tall oil and epoxidized fish oils such as menhaden and sardine oil as well as epoxidized sperm oil. These naturally occurring ethylenically unsaturated materials can be epoxidized by methods well known in the art to provide compositions having varying amounts of oxirane substitution.

Other aliphatic alcohol esters of oxirane-substituted higher fatty acids such as mono- and dihydric alcohol esters wherein the alcohol portion of the ester is a monohydric aliphatic alcohol having 1–8 carbons or dihydric aliphatic alcohol having 2–6 carbons are also contemplated. Suitable monohydric alcohols providing the alcohol moiety of the epoxy fatty acid ester include methyl, ethyl, propyl, isopropyl, butyl, isobutyl, amyl, isoamyl, hexyl, heptyl and octyl alcohols. Dihydric alcohols which may be employed to provide the alcohol moiety of the epoxy fatty acid ester include ethylene glycol, 1,2-propane diol, 1,3-propane diol, dimethyl ethylene glycol, trimethylene glycol, tetramethylene glycol, up to and including hexamethylene glycol. Polyhydric alcohol esters of the oxirane-containing fatty acids which can be employed to provide the oxirane-containing reactant include the epoxy higher fatty acid esters of tri-, tetra-, penta- and hexahydric alcohol esters of the fatty acid moiety. Included within this group are those aliphatic alcohols having 3–6 carbons and 3 or more alcohol groups. These alcohols include glycerol, erythritol, pentaerythritol and hexitols such as mannitol and sorbitol. Synthetic triglycerides such as epoxidized triolein, epoxidized trilinolein and epoxidized trilinolenin are also contemplated. Generally esters of acids of the type such as epoxidized oleic acid, epoxidized linoleic acid and epoxidized linolenic acid are preferred.

Esters of epoxidized higher fatty alcohols with lower mono- and polycarboxylic aliphatic acids are also contemplated. Included in this group are 9,10-epoxy stearoyl acetate di(9,10-epoxystearoyl) maleate and di(9,10,12,13-diepoxystearoyl) adipate.

The hydroxyl supplying reactant can be selected from the group consisting of ethers and esters of aliphatic polyhydric alcohols. Examples of compositions of this type are the alkyl phenol-polyoxyalkylene glycol adducts such as nonylphenolethylene oxide condensation products wherein 6–12 mols of ethylene oxide are combined with each mol of nonyl phenol. The alkyl group on the benzenoid ring of such compositions can contain 8–14 carbons and can be either a straight or branch chain. Lower alkyl and alkenyl ethers such as the 1–4 carbon ethers of polyoxy alkylene glycol are also contemplated.

The esters of polyoxy alkylene glycol include the higher fatty acid esters containing 10–22 carbons in the fatty acid portion of the molecule. These acids are obtainable from naturally occurring fats and oils. Tall oil fatty acid esters of polyoxy ethylene glycol having 12–18 oxyethylene groups are typical of the higher fatty acid esters of polyoxy alkylene compounds.

Typical structures of the adjacent hydroxyl and ether groups on the hydrocabon chain which before reaction were occupied by the epoxy group are as follows:

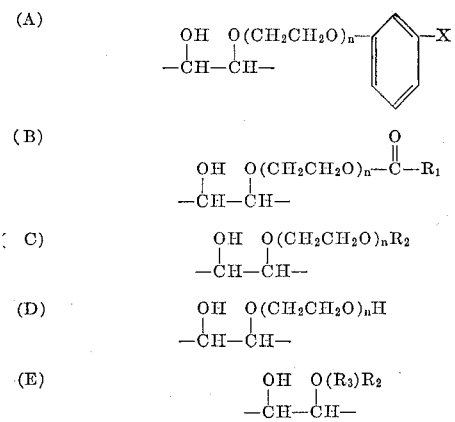

where: X is H or aliphatic hydrocarbon radical of 8–14 carbons, $R_1$ is an aliphatic hydrocarbon radical of 9–21 carbons, $R_2$ is an aliphatic hydrocarbon radical of 1–6 carbons, $R_3$ is the residue of an aliphatic polyhydric alcohol of 3–6 carbons and 3–6 hydroxy groups.

Structures A, B and C represent the products formed when polyoxy alkylene ethers having only one available hydroxyl group or polyoxyalkylene esters having only one available hydroxyl group are reacted with mono- or polyepoxides. Generally the compositions of the invention will contain from 1–5 of the groups represented by A, B and C. The structures represented by D and E are typical of the reaction between polyhydric alcohols and oxirane containing compositions having only one oxirane group. Only one of these stuctures will be present in the product.

While the compositions illustrated have for convenience been shown containing oxyethylene groups it should be understood that compositions made up of oxypropylene and oxybutylene groups are also encompassed by the invention.

In that embodiment of the invention wherein polyols are reacted with compounds having not more than one epoxy group per molecule, the polyol can be any aliphatic polyhydric alcohol having two or more hydroxyl groups. Polyols of this type include, in addition to glycols, such as ethylene glycol, propylene glycol, tetramethylene glycol, diethylene glycol, dipropylene glycol, polyoxyalkylene glycols having 2–20 polyoxyalkylene groups, glycerol, sorbitol, and generally those tri-, tetra-, penta-, and hexahydric alcohols having 3–6 hydroxyl groups and 3–6 carbons. These compounds can be combined with monoepoxides such as methyl epoxy stearate, butyl epoxy stearate, vinyl cyclohexene oxide, dicyclopentadiene oxide, etc.

The catalytic agent utilized in producing the compositions of the invention may be selected from the group consisting of strong Lewis acids and tertiary amines. Suitable catalysts include Friedel-Crafts type catalysts such as the hadides of boron, iron, aluminum, silicon, antimony, tin, arsenic, zinc, and zirconium. Also, tertiary amines such as benzyl dimethyl amine, lower C1 through C4 trialkyl amines and trialkylolamines are satisfactory catalysts. Boron trifluoride and boron trifluoride complexes are preferred, although lower alkoxides of metals such as aluminum and titanium isopropoxides and isobutoxides are also satisfactory. A catalytic amount around 0.5–7% based upon the epoxide depending upon the activity of the specific catalyst will ordinarily be employed.

The ratio of oxirane-containing material to the alcohol composition which are combined is usually maintained so that there are sufficient hydroxyl groups to react with each epoxide group and insure that the degree of functionality in the reaction product is held at a minimum. If an excess of either reactant is to be employed, it is preferred that the hydroxy compound be present in an excess.

The following examples illustrate the production of compositions coming within the scope of the present invention. Examples are presented herein merely for purposes of illustrating the invention.

*Example I*

Epoxidized soybean oil having an oxirane content of 6.95% was added to 640 grams of ethoxylated nonyl phenol. The ethoxylated nonyl phenol is the condensation product of 9.5 moles of ethylene oxide condensed with one mole of nonyl phenol. 250 grams of the epoxidized oil was added to a dispersion of 8 grams of a boron trifluoride-ethyl Cellosolve complex in the ethoxylated nonyl phenol. The mixture was stirred and an exothermic reaction took place as the polyoxyethylene ether reacted with epoxidized oil. The reaction product which was a yellow water dispersible oil was tested for surface activity and the product functioned effectively as an emulsifying agent having low foaming characteristics. Aqueous solutions of the product also exhibited a marked effect on the lubricity of the aqueous system when used as a lubricant at a metal-metal interface.

*Example II*

A dispersion was formed of 7 grams of boron trifluoride-diethyl ether complex in 550 grams of a polyoxyethylene alcohol ether. The alcohol ether is the methyl ether of polyoxyethylene glycol and has a molecular weight of 550. The dispersion was agitated and 250 grams of epoxidized soybean oil having an oxirane content of 7.02% was slowly added to the dispersion. An exothermic reaction ensued. The product, which can be characterized as a viscous liquid, showed excellent surface-active properties and facilitated the emulsification of a mixture of castor oil and unsaturated fatty acids.

*Example III*

2.0 grams of diethyl ethanolamine was dissolved in 100 grams of methyl Cellosolve and 250 grams of epoxidized soybean oil (oxirane content 7.02%) was added while the mixture was agitated. Some heating to a temperature of 70° C. was necessary to initiate the reaction. Heating at a temperature of 85° C. was maintained for a period of about 5 hours. The oily liquid reaction product had some surface activity.

*Example IV*

8 grams of boron trifluoride-diethyl ether complex was dispersed in 640 grams of ethoxylated nonyl phenol as employed in Example I and 250 grams of epoxidized methyl oleate (oxirane content 4.94%) was added while the mixture was agitated. The reaction product showed good emulsifying properties and could be used for the emulsification of mineral oil in water.

*Example V*

3.7 grams of a boron trifluoride dihydrate was dispersed in 550 grams of the methyl ether of polyoxyethylene glycol having a molecular weight of 550 and to this dispersion 250 grams of epoxidized methyl oleate (oxirane content 4.94%) was added. The exothermic reaction which took place resulted in the production of a light colored oil which when added to water in an amount of 1% based upon the water produced foaming.

*Example VI*

500 grams of polyoxyethylene glycol having a molecular weight of 1,000 was melted and 7 grams of anhydrous tin tetrachloride was dispersed in the liquid glycol. The dispersion was agitated and 250 grams of epoxidized methyl oleate (oxirane content 4.94%) was added. The exothermic reaction which resulted was permitted to go to completion and the product was tested for surface activity. The product was effective in emulsifying.

*Example VII*

8 grams of boron trifluoride-ethyl Cellosolve complex was dispersed in 640 grams of the ethoxylated nonyl phenol used in the production of the product of Example I and 140 grams of vinyl cyclohexene oxide was added while the mixture was agitated. The exothermic reaction resulted in a product which is a low foaming emulsifying agent.

*Example VIII*

A solution of 190 grams of sorbitol dissolved in 420 grams dimethyl formamide was formed and the solution was agitated while 5 grams of anhydrous stannic chloride was added. 200 grams of epoxidized butyl linoleate (oxirane content 6.5%) was slowly added while the mixture was stirred. An exothermic reaction was initiated and the reaction mixture darkened. When the reaction was complete as indicated by termination of the rise in temperature, the product was tested as an emulsifier for benzene-water mixtures and was found to function effectively.

Diverse combinations of oxirane-containing materials and ethers and esters of polyoxyalkylene glycols can be reacted to produce compositions having unusual micellar properties leading to exceptional utility of the products as emulsifying and dispersing agents. Many of the products appear to absorb strongly at metal interfaces; thus, providing superior lubricant properties in metal forming operations.

Obviously many modifications and variations of the invention as hereinbefore set forth may be made without departing from the spirit and scope thereof, and, therefore, only those limitations should be imposed as are indicated in the appended claims.

I claim:
1. Esters of higher fatty acids, the fatty acyl chain of said esters having substituted on adjacent carbons hydroxyl groups and ether radicals, said ether radicals being ethers of alkoxylated alkyl phenols.
2. Esters of higher fatty acids, the fatty acyl chains of said esters having substituted on adjacent carbons hydroxyl groups and oxyethyleneoxy-nonyl phenyl radicals.
3. Glyceride esters of higher fatty acids, the fatty acyl chain of said esters having substituted on adjacent carbons hydroxyl groups and ether radicals, said ether radicals being selected from alkoxylated alkyl phenols.
4. The composition of claim 3 wherein the glyceride esters are vegetable oil glycerides.
5. The composition of claim 3 wherein the glyceride esters are animal fat glycerides.
6. The composition of claim 3 wherein the glyceride esters are derived from marine oils.
7. A triglyceride wherein at least one of the fatty acid radicals of said triglyceride has in the fatty chain hydroxyl and ether substitution characterized by

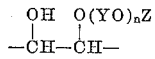

where Y is an alkylene group of 2–4 carbons, $n$ is 2–20 and Z is an alkoxylated alkyl phenol radical.

References Cited by the Examiner

UNITED STATES PATENTS

| | | | |
|---|---|---|---|
| 2,260,753 | 10/1941 | Marple et al. | 260—398 X |
| 2,778,855 | 1/1957 | Shokal et al. | 260—410.6 |
| 3,035,069 | 5/1962 | Findley et al. | 260—398 |
| 3,040,076 | 6/1962 | Seidel et al. | 260—410.6 |
| 3,066,159 | 11/1962 | De Groote | 260—410.7 |

OTHER REFERENCES

"Chemical and Engineering News," Aug. 28, 1961, p. 35.

CHARLES B. PARKER, *Primary Examiner.*

TOBIAS E. LEVOW, DANIEL D. HORWITZ,
*Examiners.*